(No Model.)

O. B. SHALLENBERGER.
REGULATOR FOR SELF EXCITING ALTERNATE CURRENT ELECTRIC GENERATORS.

No. 366,349. Patented July 12, 1887.

Witnesses
Charles A. Terry
Carrie E. Ashley

Inventor
Oliver B. Shallenberger
By his Attorneys
Pope & Edgecomb

N. PETERS, Photo-Lithographer, Washington, D. C.

UNITED STATES PATENT OFFICE.

OLIVER B. SHALLENBERGER, OF ROCHESTER, ASSIGNOR TO GEORGE WESTINGHOUSE, JR., OF PITTSBURG, PENNSYLVANIA.

REGULATOR FOR SELF-EXCITING ALTERNATE-CURRENT ELECTRIC GENERATORS.

SPECIFICATION forming part of Letters Patent No. 366,349, dated July 12, 1887.

Application filed December 2, 1886. Serial No. 220,463. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Regulating Self-Exciting Alternate-Current Electric Generators, of which the following is a specification.

The invention relates especially to the method of maintaining the field of force by currents derived from the generator itself; and it consists, in general terms, in deriving alternating secondary or induced currents from the primary or generated currents, and causing such alternating induced currents to be converted into a continuous current, which is caused to traverse the coils of the field-magnets and maintain the magnetism of the same.

In an application filed by me October 12, 1886, (Serial No. 215,994,) there is described an organization of apparatus upon which the present invention is based. This invention, however, is designed to provide means for regulating and automatically controlling the current delivered to the exterior or work circuit, so as to maintain an approximately constant difference of potential. To this end the converter which transforms the currents supplied to the field-magnets is constructed upon the principle of a compound-wound dynamo-electric machine—that is to say, with one coil connected in series with the feeders and a second independent coil connected in a shunt. The two coils combine to produce the required difference of potential at the terminals of the secondary coil of the converter, irrespective of variations in the volumn of the current delivered by said secondary coil.

Figure 1:
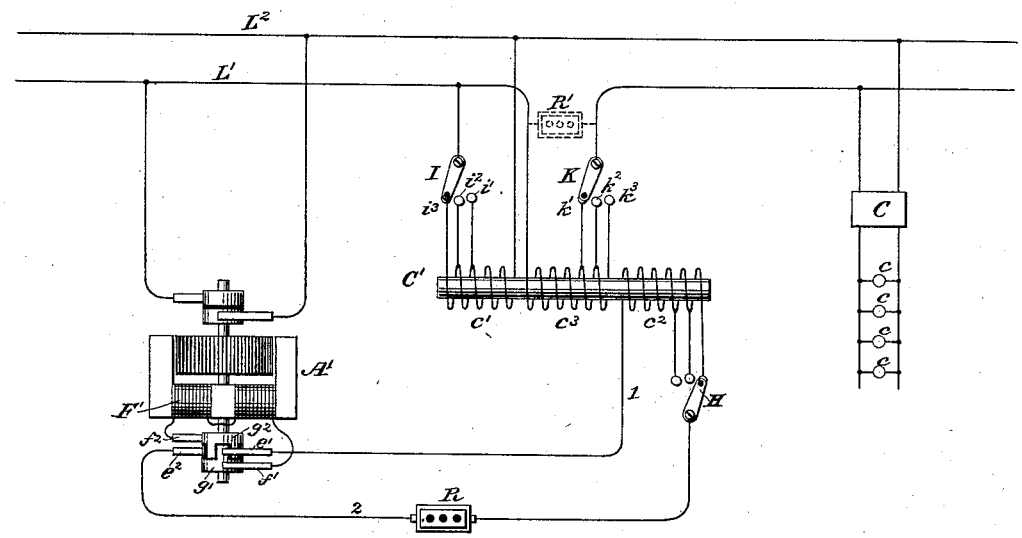
Figure 2:
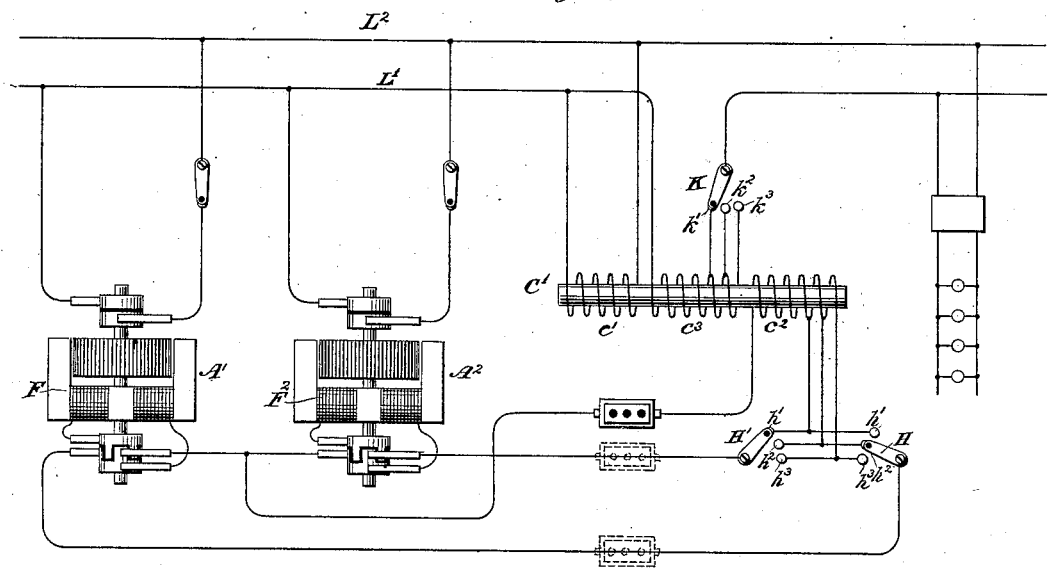

In the accompanying drawings, Figure 1 is a diagram illustrating the organization of the apparatus. Fig. 2 illustrates a method of simultaneously supplying the fields of more than one generator.

Referring to Fig. 1, A' represents an alternate-current generator of any suitable character. The currents from the generator are transmitted through conductors L' and L², and are designed to be employed to actuate any suitable form of translating device—such, for instance, as incandescent electric lamps. At $c\,c$ are shown such devices connected in the secondary circuit of an induction-coil or converter, C.

The currents required for maintaining the field of force of the generator are derived from a special converter, C', having two separate and independent primary coils, both of which are connected with the generator through the main conductors L' and L², but in multiple-arc relation with each other. One of the coils, $c'$, is also in multiple-arc relation with the translating devices or the current-consuming devices, while the other coil, $c^3$, is connected in series therewith. The secondary circuit or coil $c^2$ has one terminal connected with a conductor, 1, leading to a contact-brush, $e'$, applied to a commutator, E, mounted upon a shaft of the generator. A second brush, $e^2$, is connected through a conductor, 2, with the remaining terminal of the coil $c^2$. Two contact-brushes, $f'\,f^2$, are respectively connected with the terminals of the field-magnet coil F' of the generator. It is designed that the alternating currents induced in the secondary coil shall be transformed into a continuous current by the commutator E, and thus traverse the loop containing the coils F' always in the same direction. For this purpose the commutator is made in a well-known manner with alternate conducting plates or surfaces $g'\,g^2$, against which the brushes rest. The brushes $f'\,f^2$ are at all times in contact, respectively, with the plates $g'\,g^2$, while the brushes $e'\,e^2$ make alternate connection with the plates corresponding with the changes in the direction of the current induced in the secondary coil.

The commutator may, it is evident, be constructed upon well-known principles. Ordinarily it will be desirable to effect several changes in direction of current in the course of each revolution of the armature, and in any case the number of changes produced by the commutator will correspond with the number of alternations during each revolution.

It is evident that if the magnetic field of the generator be maintained at a constant intensity, the variations in current delivered by the armature will, in consequence of its internal resistance, cause a variation in the electro-motive force at its terminals; and, furthermore, the loss of energy in the feeders will cause a further variation in the difference of potential in the work-circuit. In addition to these effects, any variation of the difference of potential in the primary circuit will effect the difference of potential at the terminals of the secondary coil of the converter $c^2$, and cause a corresponding change in the field of the generator, thereby increasing the variation in the electro-motive force of the armature. In my former application for a patent, above referred to, these variations are controlled by utilizing a greater or less number of active coils in the converter, or by the introduction of resistances into the field-circuit. In the present instance this result is effected automatically through the agency of the third coil, $c^3$. This coil assists the primary coil $c'$, and is connected in series in the line $L'$. From this it results that the converter is affected both by the main current in the coil $c^3$ and by the current in the coil $c'$, which is proportional to the electro-motive force of the generator $A'$. Any increase in the volume of current delivered will slightly lower the electro-motive force of the generator $A'$, and this falling off correspondingly affects the current in the coil $c'$. This decrease, however, is compensated for by the increase in the current traversing the coil $c^3$, which tends to increase the difference of potential between the terminals of the secondary coil $c^2$.

The coil $c^3$ is preferably wound with separate terminals $h'$ $h^2$ $h^3$. A switch, K, is employed in connection with these, to include a greater or less number of convolutions of the coil $c^3$ in circuit, as required. If, for instance, the translating devices were located so near the dynamo $A'$ that the loss of energy or fall of potential upon the feeders might be disregarded, a constant difference of potential at the terminals of the dynamo would be essential, and the coil $c^3$ would be required only to compensate for the falling off due to the armature resistance, the switch K might then be placed upon the terminal $h'$ or $h^2$. If, however, the feeders show a loss of, say, five per cent. when carrying a full load, it is evident that the electro-motive force of the dynamo must be slightly augmented as the load increases to compensate for the greater loss in transmission. In this case the length of the coil $c^3$ would be increased by placing the switch K upon the terminal $h^2$ or $h^3$. The length of the active portion of the coil $c^3$ should be adjusted to the working conditions of the particular plant of which it forms a part, and when once adjusted need not be changed.

The coil $c'$ may also be provided with multiple terminals $i'$ $i^2$ $i^3$ and a switch, I, to change the quantitative relation of the primary coil $c'$ to the primary coil $c^3$. The switch H and the terminal points $h'$ $h^2$ $h^3$ permit the adjustment of the secondary coil $c^2$ to obtain the desired initial electro-motive force.

Instead of the contact-switch K, the effect of the coil $c^3$ may be varied by means of an adjustable resistance, R, placed as a shunt across its terminals, so that a greater or less portion of the primary current will traverse the coil $c^3$.

In Fig. 2 there is shown a method of exciting two or more generators by currents derived from the work-circuit $L^2$. In this instance two generators, $A'$ $A^2$, are shown. These have their like poles connected with the main lines $L'$ $L^2$ in parallel, and both have their fields maintained by currents derived from the secondary coils of the converter $C'$, the primary coils $c'$ and $c^3$ of which are respectively included in circuit in the same manner as described with reference to Fig. 1.

The active proportion of the secondary coil included in circuit for supplying the field-magnet coils $F'$, of the generator $A'$, may be adjustable by a switch, H, and contact-points $h'$ $h^2$ $h^3$, as before, and likewise an adjustable resistance may be included in circuit, if desired. By means of a switch, H', and corresponding points $h'$ $h^2$ $h^3$, the amount of active secondary wire included in circuit with the field-magnet $F^2$ of the generator $A^2$ may be varied independently of the generator $A'$, and vice versa.

I claim as my invention—

1. The combination, with an alternate-current generator and its work-circuit, of an inductorium or converter having two primary coils, one connected in a shunt upon the work-circuit and the other in series therewith, a commutator included in the secondary circuit of the converter, and conductors leading from said commutator to the field-magnet coil of the generator.

2. The combination, substantially as hereinbefore set forth, with an alternate-current generator and its work-circuit, of a converter having two primary coils for modifying the current from said generator, the one connected in multiple arc with the work-circuit and the other in series with the work-circuit.

3. The combination, substantially as hereinbefore set forth, of an alternate-current generator, its work-circuit, an electric converter having a coil connected in multiple arc with the work-circuit, a second coil connected in series with said work-circuit, a third coil connected through the field-magnet coils of the generator, a commutating device included in the circuit of the last-named coils, and a switch for including more or less convolutions of said coils in circuit, substantially as described.

4. The combination, substantially as hereinbefore set forth, of an alternate-current generator, an electric converter having coils connected in shunt and other coils connected in series with the work-circuit of the generator, and means, substantially as described, for varying the effect of one of said coils.

5. The combination, substantially as described, of an alternate-current generator, an electric converter having two primary coils, one connected in shunt and the other in series with the work-circuit, and means for varying the effect of either or both of said coils.

In testimony whereof I have hereunto subscribed my name this 27th day of October, A. D. 1886.

OLIVER B. SHALLENBERGER.

Witnesses:
    CHARLES A. TERRY,
    ALBERT SCHMID.